Oct. 28, 1958         J. McEWAN ET AL         2,857,943
UNIVERSAL MITER GAUGE
Original Filed May 17, 1954
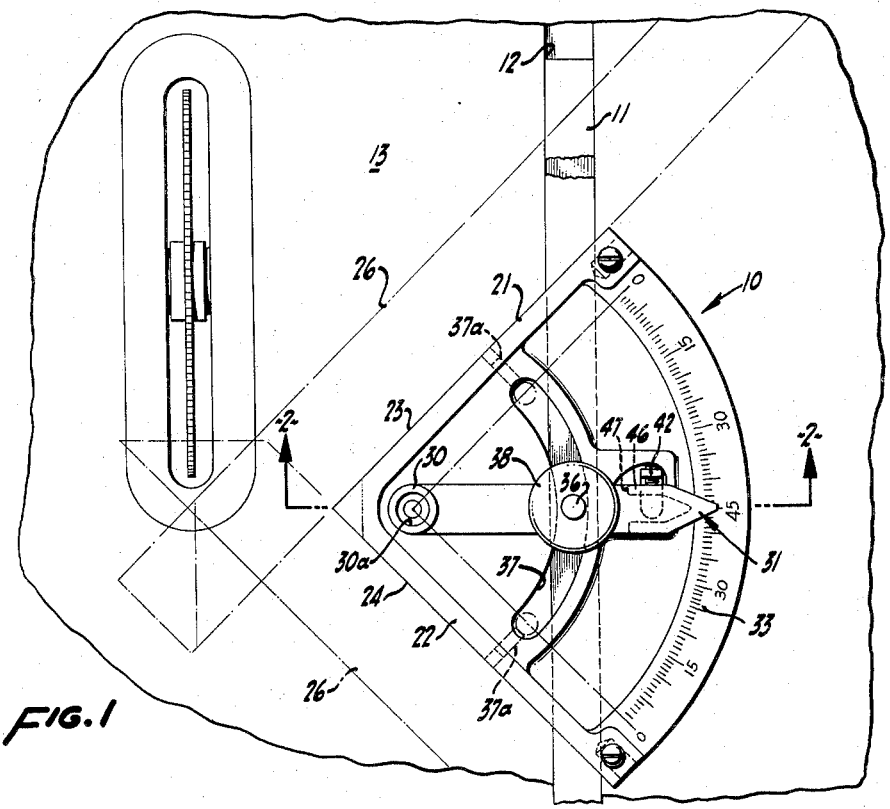
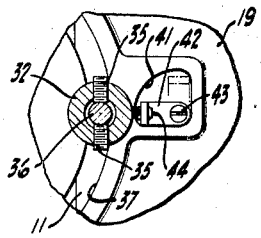
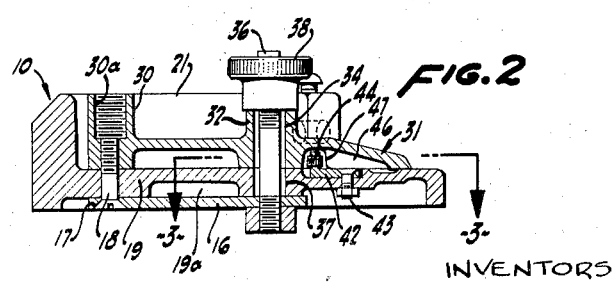
INVENTORS
JAMES McEWAN AND
JAMES E. THOMPSON
BY *Harper Allen*
Attorney

United States Patent Office 2,857,943
Patented Oct. 28, 1958

2,857,943

UNIVERSAL MITER GAUGE

James McEwan and James E. Thompson, San Jose, Calif.; said Thompson assignor to said McEwan Continuation of application Serial No. 430,299, May 17, 1954. This application October 8, 1956, Serial No. 614,528

10 Claims. (Cl. 143—169)

The present invention relates to miter or angle gauges for use with tools such as bench grinders, disc sanders and bench saws and is concerned more particularly with an angle gauge providing right angle work engaging surfaces to enable sanding or cutting of surfaces at complementary angles.

This application is a continuation of our application Serial No. 430,299, filed May 17, 1954 for Universal Miter Gauge, now abandoned.

It is a general object of the invention to provide an improved miter gauge for tools of the above character.

A further object of the invention is to provide a miter gauge for use on the table of a tool such a bench grinder having two surfaces for engaging the work and holding it at right angles to enable the finishing of surfaces at a complementary angle to each other.

Another object of the invention is to provide a miter gauge which can be stopped selectively at a given angularly adjusted position and which is mounted in an advantageous manner to provide support for the work closely adjacent the working tool.

Still another object of this invention is to provide an improved miter gauge having two surfaces for engaging the work, said surfaces being disposed at right angles to each other to form an apex and being pivoted adpacent to said apex to a slideable member such that said surfaces which may be adjusted to different angles with respect to the rotatable tool may be employed to present the work to said rotatable tool at different angles.

Still another object of this invention is to provide an improved miter gauge that is adapted to be employed with rotatable tools having a work table associated therewith, said miter gauge having a guide bar slideable in a slot provided in said table for traversing the miter gauge past said rotatable tool, the miter gauge having a pair of work guiding surfaces which are disposed at right angles to each other and which may be angularly adjusted over a wide range of complementary angles with respect to the rotatable tools.

Still another object of this invention is to provide an improved miter gauge for use with rotatable tools, said miter gauge being provided with adjusting means whereby the pointer thereof may be adjusted relative to the square work engaging surfaces or sides of the gauge and relative to the scale thereof.

A further object of this invention is to provide an improved miter gauge in which a screw is employed for clamping the gauge body and scale pointer firmly to the slide bar so that all three of these elements may be clamped or unclamped simply by manipulating this screw.

Still another object of this invention is to provide an improved miter gauge with two scales from zero to 45 degrees each arranged so that when the pointer of the gauge is at zero when one of the work engaging surfaces of the gauge is at right angles to the slide bar.

A further object of this invention is to provide an improved miter gauge having a scale pointer that is near the apex of the triangle formed by the two work engaging surfaces or faces of the gauge so as to permit maximum sweep of the scale pointer with respect to the gauge scale, thereby providing greater accuracy in the positioning of the gauge on various degree markings of the scale.

Another object of this invention is to provide an improved miter gauge in which all of the working parts are located within the body of the gauge instead of projecting beyond so that these working parts are protected by said body and thereby maintain their adjustment more accurately.

Other objects and advantages of the invention will be apparent from the following description of a preferred embodiment thereof, as illustrated in the accompanying drawings, in which:

Figure 1 is a plan view of the miter gauge shown in place on the table of a disc sander.

Figure 2 is a vertical sectional view through the miter gauge taken in a plane indicated by the line 2—2 in Figure 1.

Figure 3 is a fragmentary horizontal section through the miter gauge taken in a plane indicated by the line 3—3 in Figure 2.

Referring to the drawings, the invention includes an angle or miter gauge 10 having a guide bar 11 seated in a transverse groove or slot 12 of a tool such as a bench saw 13, and having a pointer 31 cooperating with an arcuate scale 33. The guide bar 11 carries centrally thereof a strap or radius arm member which extends transversely to the slot 12 and to the direction of sliding movement of the bar 11 in the slot. The member 16 has an aperture 17 adjacent its outer end freely pivoting on a pintle screw 18 journalled in the bottom wall 19 of the miter gauge 10 and threaded into a boss 30 of the pointer 31. It will be noted that the lower surface of the wall 19, is recessed at 19a so that the radius arm or strap 16 can swing in this recess during adjustment of the gauge with reference to its guide bar, and thereby with reference to the work.

Integrally formed with the bottom wall 19 of the angle gauge 10 are a pair of upright walls 21 and 22 having external surfaces formed at a right angle to each other and providing the guiding surfaces for the work 26, indicated in dotted lines in Figure 1, when it is to be engaged with the working tool. The transverse member 16 extends between the work engaging surfaces provided by the upright walls 21 and 22, that is the member 16 is included within the right angle formed by the work engaging surfaces. A boss 32 intermediate the ends of the pointer 31 is apertured at 34 to receive a clamping screw 36 which also passes freely through an arcuate slot 37 in the wall 19 and is secured in the guide bar 11. Set screws 37a at the ends of the slot serve as stops for the pointer screw 36.

It will be noted that the aperture 34 in the boss 32 of the pointer is a clearance aperture to allow shifting movement of the pointer 31 with reference to its clamping stud or screw 36. In order to control this movement, a pair of set screws 35 (Figure 3) are threaded into the boss 32 at either side of the screw 36 and by appropriate adjustment of these set screws the position of the pointer with reference to its guide bar and the scale 33 can be accurately adjusted. A knurled clamp nut 38 is threaded on the upper end of the stud 36 and serves to adjustably clamp the pointer on the gauge in a selected angular position.

Preferably means is provided which can be selectively employed to determine positioning of the pointer 31 exactly at its 45 degree position. For this purpose the bottom wall 19 of the miter gauge has a recessed portion 41 formed therein in which an angle stop 42 is pivoted by means of a screw 43. The vertical arm of the angle stop 42 is provided with a set screw 44 forming an adjustable stop for engagement by depending wall 46 in the arched front portion of the pointer, adjacent a clearance recess 47 for the angle stop 42. With the angle stop 42 positioned parallel to the pointer arm 31, the recess 47 will clear the stop 42 and the pointer can be swung freely in either direction. With the angle stop 42 positioned perpendicular to the pointer arm 31, the wall 46 of the pointer arm 31 engages the set screw 44 and will stop the arm 31 in its 45 degree position, so that the surfaces 23 and 24 of the walls 21 and 22 will define equal angles with the guide bar 11 and with the working tool.

At its rearward end adjacent the pivot point, the pointer 31 is provided with a threaded recess 30a in the boss 30 for receiving a conventional hold-down clamp (not shown) for use with work. It will be noted that the position of this hold-down clamp is coincident with the pivotal axis of the gauge, and this pivotal axis is closely adjacent the apex of joining of the side walls 21 and 22 of the gauge.

It will be noted that the pointer design of the instant invention provides for several functions of this pointer or arrow and that in fact in effect it acts as a clamp bar, a pointer, a support for a hold-down clamp, a sidewise aligning device, a stop bar at each end of the protractor scale, and a stop bar at the 45 degree angle position.

It will be seen also from the above description that the angle or miter gauge 10 is mounted by the pintle 18 closely adjacent the apex or meeting of the two sides 23 and 24 so that the movement of the gauge in being adjusted is with reference to an offset pivot point with respect to the guide bar 11. This enables positioning of the work support at a desired close position to the working tool in any angularly adjusted position of the angle gauge. Due to the small radius of the apex from the pivot of the pointer arm, the amount of displacement of the guide surfaces with respect to the working tool is held at a minimum.

In Figure 1 two positions of the work are shown with respect to the gauge in which two 45 degree bevel cuts are made on the work.

While we have shown and described a preferred embodiment of the invention, it will be understood that the invention is capable of variation and modification from the form shown, so that its scope should be limited only by the scope of the claims appended hereto.

We claim:

1. A miter gauge for rotatable tools such as saws and the like having a work table that may be tilted with respect to the rotatable tool but which is otherwise fixed with respect thereto, said table having a slot extending substantially throughout the length thereof, the improvement comprising a guide bar slideable in the slot of the table, a transverse member having one end thereof secured to said guide bar and extending transversely to said slot and to the direction of sliding movement of said bar in said slot, the free end of said transverse member being adapted to be guided past said rotatable tool by said guide bar, a gauge member having a base portion for engagement with the surface of the work table and having two work engaging surfaces extending upwardly from said base portion, said surfaces being joined together to form an apex and being disposed at a right angle with respect to each other, a pintle pivotally adjustably connecting said gauge member to said transverse member, with said transverse member being included within the right angle formed by said work engaging surfaces, said pintle being attached to said gauge member adjacent to the apex of said surfaces and adjacent to said free end of said transverse member so that said apex of said surfaces may be swept past and close to said rotatable tool in any position of adjustment of said gauge member relative to said transverse member by slideably moving said guide bar in said slot, said gauge member having angular graduations positioned about an arc of which said pintle is the center and a pointer member fixedly attached to said transverse member and being positioned substantially parallel thereto, said pointer member cooperating with said angular graduations to indicate the angles at which either one of said upright surfaces is disposed with respect to said transverse member and locking means for holding said gauge member in predetermined positions on said transverse member.

2. A miter gauge for rotatable tools as set forth in claim 1, further characterized in that a pair of angular graduations are provided to said gauge member, each of said graduations extending over an arc of 45 degrees and being arranged so that the 45 degree positions of both of said graduations coincide, said scales cooperating with said pointer to indicate the positions of said surfaces with respect to said transverse member, both of said surfaces being at 45 degrees with respect to said transverse member when said pointer is at the common 45 degree position of said scales.

3. A miter gauge for rotatable tools as set forth in claim 2, further characterized in that said locking means holds the base portion of said gauge member clamped between said transverse member and said pointer member and comprises a clamping screw so that said three members may be firmly clamped together thereby and said work engaging surfaces may thus be disposed at any angle from zero to 45 degrees with respect to said transverse member.

4. A miter gauge for rotatable tools as set forth in claim 3, further characterized in that means is provided to said pointer member for slightly adjusting said pointer member with respect to said transverse member so that said pointer member may be positioned exactly at 45 degrees on said scales when said surfaces are disposed at this angle with respect to said transverse member.

5. A miter gauge for rotatable tools as set forth in claim 3, further characterized in that the bottom of said gauge member base portion is hollowed out to receive said transverse member so that the bottom edges of said work engaging surfaces and the bottom of said transverse member all rest smoothly on the work table of the rotatable tool.

6. A miter gauge for rotatable tools as set forth in claim 3, further characterized in that the pointer member and said scales are positioned on the base portion of said gauge member and said work engaging surfaces extend upwardly to protect said pointer from being bumped out of adjustment by work pieces.

7. A miter gauge for rotatable tools as set forth in claim 4, further characterized in that there is provided an arcuate slot in the base portion of said gauge member through which said clamping screw extends between said transverse member and said pointer member.

8. A miter gauge for rotatable tools as set forth in claim 3 further characterized in that a stop member is attached to the base portion of said miter gauge to stop said pointer member at its 45 degree position, means for pivoting said stop member to said base member so that said stop member may be swung out of the way of said pointer member.

9. A miter gauge for rotatable tools as set forth in claim 8, further characterized in that said stop member is provided with adjustable means for engaging said pointer member and positioning it exactly at 45 degrees on said scales.

10. In a miter gauge for tools having a work table with a slot extending therealong, a guide bar for releasable slideable engagement with said slot, a transverse extension secured to said guide bar, a gauge member having a base portion for engagement with the surface of the table and having two upright surfaces extending upwardly from said base portion and forming a right angle with each other, said base portion being recessed to receive said transverse extension, said gauge member having a pivotal connection to said transverse extension adjacent the apex of said surfaces and adjacent the end of said surfaces and adjacent the end of said transverse extension remote from said bar, angle graduations on said gauge member, a pointer secured to said transverse extension and pivoted at said pivotal connection for cooperation with said angle graduations, said base portion having means forming an arcuate slot, adjustable elements at the respective ends of the slot for engagement by said pointer, means forming a limit stop for said pointer at a selected intermediate one of said graduations, a clamp-down stud mounted in said guide bar and extending upwardly through said arcuate slot, a clamping nut for engaging said stud and for engaging said pointer, and adjustable setscrews between said stud and said pointer to enable relative adjustment therebetween.

References Cited in the file of this patent
UNITED STATES PATENTS

| | | |
|---|---|---|
| 327,651 | Bradshaw | Oct. 6, 1885 |
| 486,186 | Thornton | Nov. 15, 1892 |
| 1,179,140 | Repp | Apr. 11, 1916 |
| 1,452,233 | Zsuffa | Apr. 17, 1923 |
| 1,894,010 | Tautz | Jan. 10, 1933 |
| 2,090,548 | Nielsen | Aug. 17, 1937 |
| 2,601,878 | Anderson | July 1, 1952 |